Figure 1:
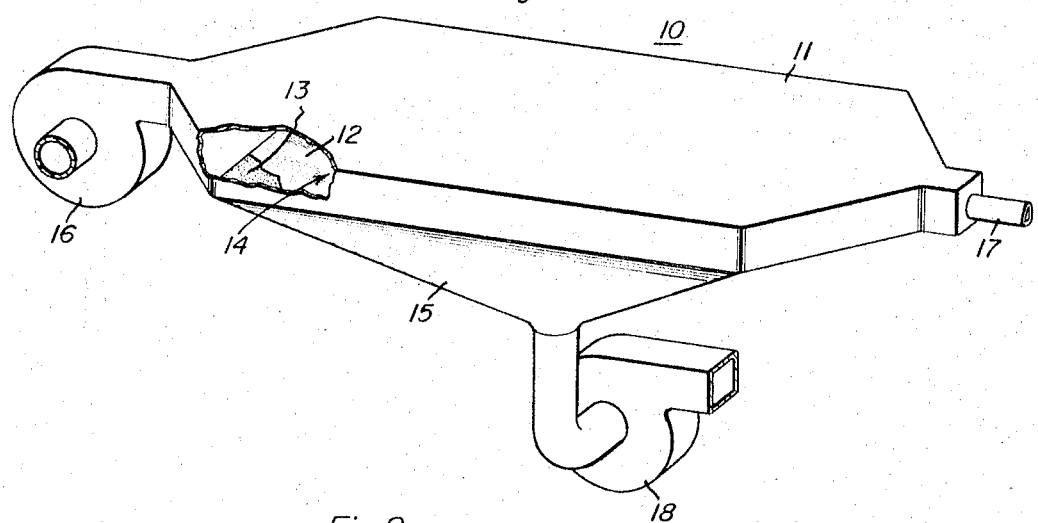

Nov. 7, 1967  W. L. ROBB  3,350,844
PROCESS FOR THE SEPARATION OR ENRICHMENT OF GASES
Filed Sept. 21, 1964

Inventor:
Walter L. Robb,
by Joseph T. Cohen
His Attorney.

United States Patent Office 3,350,844
Patented Nov. 7, 1967

3,350,844
PROCESS FOR THE SEPARATION OR
ENRICHMENT OF GASES
Walter L. Robb, Scotia, N.Y., assignor to General Electric
Company, a corporation of New York
Filed Sept. 21, 1964, Ser. No. 397,687
8 Claims. (Cl. 55—16)

This invention relates to the separation or enrichment of gases by permeation thereof through thin permeable films or membranes of a polyarylene oxide film. More particularly, the invention relates to a process for separating or enriching a gas selected from the class consisting of helium (which term is intended to include isotopes of helium, such as $He^3$ and $He^4$), hydrogen (which term is intended to include deuterium and tritium), oxygen and nitrogen from a mixture of gases containing at least one of the former, which process comprises causing at least a portion of said mixture of gases to permeate through a solid polyarylene oxide film whereby a gaseous product enriched in one of said gases is obtained.

Separation, enrichment, or the resultant recovery is described as follows. In a separation process practiced on air, for example, a considerable amount of oxygen and some small amount of nitrogen and other gases are drawn through the membrane. The process may be described generally as separation of oxygen from a mixture of gases or that a gas is provided which is enriched in oxygen. The remaining gas may be referred to as enriched in nitrogen.

One important application of this invention is helium recovery. Recovering helium from natural gas mixtures is becoming more important because of the increased and widespread usage of helium together with the fact that the supply of helium is limited. The mentioned natural gas recovery is important because the more substantial source of helium is in natural gas wells or sources where helium is present in a gas mixture. In this connection, several helium recovery processes relating to charcoal adsorption, distillation, etc., are available, but these processes include various disadvantages, such as high overall cost of the operation, required location of the equipment for separation purposes, a high degree of complexity, and rather prohibitive operating parameters, such as high pressures and low temperatures. Another of the more useful separation processes which would be desirable from a commercial viewpoint involves separating $helium^3$ from $helium^4$.

The separation of nitrogen from various gas mixtures to obtain a gas enriched in this element is also a desirable feature. However, gaseous nitrogen may be desirable in some uses in varying amounts at relatively low purity, at remote locations, etc., all of which may not economically warrant prior nitrogen separation processes and apparatus involving distillation, low temperatures, charcoal adsorption, etc. In some instances, a gas mixture which includes nitrogen also includes gases, such as hydrogen, which are difficult to separate from the mixture except by relatively complex and usually uneconomical processes, so that the separation is not undertaken. One of the problems in the separation of nitrogen is the fact that some previously reported membranes used to remove nitrogen also allowed the passage of considerable amounts of nitrogen with the hydrogen, so that the separation is not as satisfactory as would be desired.

It is, therefore, one of the objects of this invention to provide a process whereby hydrogen is separated from deuterium or tritium to yield essentially pure deuterium or tritium substantially free of hydrogen and the separation of deuterium and tritium.

It is another object of this invention to provide a method for the recovery of helium from natural gas or from air and to separate $helium^3$ from $helium^4$.

It is a further object of the invention to provide an improved process for separating nitrogen from air to provide a product enriched in either nitrogen or oxygen.

It is a still further object of the invention to provide gas separation or enrichment of nitrogen from a mixture containing nitrogen and hydrogen by means of a thin, permeable membrane.

It is another object of this invention to provide a permeable, solid polyarylene oxide membrane process for separation of the aforesaid gases from mixtures containing the same.

Other objects of the invention will become more apparent from the description which follows:

Briefly described, this invention comprises the use of a thin film or membrane of a polyarylene oxide material as a barrier or permeable membrane for a mixture of gases from which it is desired to separate at least one gas selected from the class consisting of helium, hydrogen, oxygen, and nitrogen, and providing separation or enrichment by diffusion of one or more of the gases through the membrane.

The arylene oxide polymers which are employed in the practice of my invention comprise those having a recurring structural unit of the general formula (I) 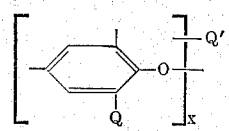

wherein the oxygen atom of one unit is connected to the benzene nucleus of the adjoining unit, preferably in the para position, but also some connections being ortho, or in combinations of these positions, $x$ is a positive integer equal, for instance, to above 75, and advantageously above 100, e.g., from about 100 to 100,000 or more, Q is a monovalent substituent selected from the class consisting of hydrogen; aliphatic hydrocarbon radicals free of a tertiary alpha-carbon atom, i.e., such a radical having at least one hydrogen atom on the carbon atom adjacent to the phenyl nucleus (e.g., methyl, ethyl, propyl, isopropyl, butyl, etc., radicals); and aralkyl radicals, alkaryl radicals, and aryl radicals, each being free of a tertiary alpha-carbon atom (e.g., benzyl, phenylethyl, tolyl, xylyl, ethylphenyl, phenyl, naphthyl, biphenyl, etc.). Q' is a monovalent substituent which may be the same as Q and, in addition, may be halogen (e.g., chlorine, bromine, fluorine, etc.); and a hydrocarbonoxy radical free of a tertiary alpha-carbon atom (e.g., methoxy, ethoxy, propoxy, butoxy, isopropoxy, phenoxy, ethylphenoxy, xylyloxy, tolyloxy, etc.).

These phenylene polymers may be prepared in various ways. One method comprises oxidizing a phenol represented by the formula (II) 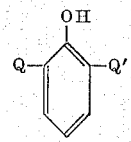

where Q and Q' have the meanings given above. These phenols are oxidized by passing an oxygen-containing gas (for example oxygen itself or air) through the particular phenol in the presence of a catalyst system comprising a cuprous salt and a tertiary amine. Two different methods for preparing these polyarylene oxides, as well as examples of appropriate starting materials and polymers prepared therefrom, particularly polymers from 2,6-xylenol, are disclosed in an article by A. S. Hay in Journal of Polymer Science, 58, 581 (1962), entitled, "Polymerization by Oxidative Coupling"; and in French Patent 1,234,336 issued May 16, 1960. By reference, this article and patent are made part of the disclosures and teachings of the instant application as to the polymers used in the practice of this invention in order to avoid undue prolixity in reciting the starting ingredients, the catalyst systems, the conditions, etc., as well as the various radicals which the substituents in the above general formulas may represent.

A specific method for preparing an arylene oxide polymer (which has an intrinsic viscosity of about 0.6 deciliter per gram in $CHCl_3$ at 25° C. and a molecular weight average in excess of about 20,000 when determined osmotically) is as follows. Oxygen was passed for 75 minutes into a reaction mixture containing 20 parts 2,6-dimethylphenol, 0.14 part cuprous chloride ($Cu_2Cl_2$), about 19.8 parts benzene and 23 parts pyridine. During the course of the reaction the temperature was held to a maximum of 40° C. After the reaction, the mixture was diluted with 616 parts benzene and the product was precipitated by pouring the reaction mixture into about 2014 parts methanol containing about 8 parts HCl, and the polymer was then separated by filtration. The product poly-(2,6-dimethyl-1,4-phenylene) ether was characterized by the recurring structural unit of the formula (III)
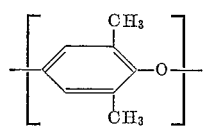

This product (which will hereinafter be identified as "polyxylylene oxide") had a melting point in excess of 250° C. It was soluble in such solvents as benzene, toluene, xylene, and chloroform.

In practicing the present invention, the thin, permeable polyarylene oxide film is employed as a barrier means and one side of the film is exposed to the specific mixture of gases in which the permeability of, for example, one of the gases it is desired to separate, for instance, oxygen, is substantially different from the permeability of the remaining gases. Therefore, a gas is recovered from the other side of the film barrier which is either enriched in the desired gas, for instance, oxygen or substantially depleted in the desired gas, for instance, again oxygen, depending on the component gases in the starting mixture.

The advantage of my invention resides in the fact that there is a high selectivity for the desired gases in their passage through the polyarylene oxide film. What is further important is the fact that in separating the aforesaid gases or obtaining gases enriched in these desired species of gases, the polyarylene oxide membranes can be made in very thin films, for instance, in thicknesses as low as 0.03 to 1 mil thick. In this thickness, the film is, nevertheless, quite strong and is readily amenable to continuous separation of gases with a plurality of membranes in fixed position.

Other membranes have been used in the past for the separation of gases. For instance, silicone rubber membranes have been found to separate individual gases from a mixture of the latter and other gases. Thus, in Kammermeyer U.S. Patent 2,966,235, issued December 27, 1960, there is disclosed a method of separating carbon dioxide from a gas mixture containing carbon dioxide and other gases, such as hydrogen, nitrogen, oxygen and helium, by permeation of the gases through a thin, non-porous silicone rubber membrane. Kammermeyer had found that carbon dioxide flows more rapidly through the non-porous silicone rubber membrane than any of the other gases mentioned, so that the permeation of carbon dioxide through this membrane can be said to be much higher than that of the other gases on a relative basis.

However, one of the difficulties in using silicone rubber for this purpose is the fact that it is difficult to obtain silicone rubber of adequate thinness free of pinholes while still maintaining satisfactory strength of film. As a matter of fact, considerably difficulty has been encountered in making films of silicone rubber below 3 to 5 mils thick. Thinner films of silicone rubber have been produced by a special technique which is more particularly disclosed and claimed in my copending application, Serial No. 269,430, filed April 1, 1963, now abandoned and assigned to the same assignee as the present invention. However, although the permeability is greater through the silicone rubber film, than through the polyarylene oxide film for certain gases, nevertheless, the ratio of the permeation rates of certain gases is not sufficiently large to recommend the silicone rubber membrane. Also, considerably care must be exercised in making the silicone rubber films and this involves increased expense and effort. By using polyarylene oxide films, one can take advantage of the high permeation rates of certain gases (as contrasted to lower permeation rates of other gases from which the former is separated) to obtain the desired selectivity of the enriched gases.

Figure 2:
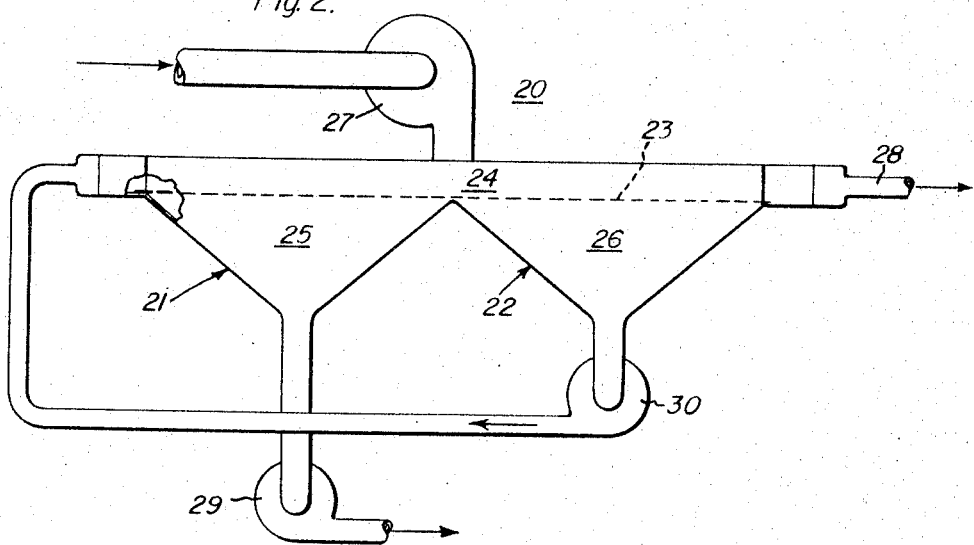

This invention will be better understood when taken in connection with the following description and the drawings in which:

FIG. 1 is an exemplary apparatus utilized to illustrate the gas selectivity of a polyarylene oxide membrane; and FIG. 2 is an illustration of a two-stage separation device to recover individual gases.

An example of gas separation in a preferred form of this invention is described in relation to FIG. 1. In FIG. 1 there is illustrated an exemplary permeable membrane device 10 for specific gas separation or enrichment. Device 10 includes a channel or duct member 11 adapted for passage of a gas therethrough. In duct 11 there is positioned a permeable membrane 12 of the polyarylene oxide resin of this invention. The membrane 12 may be from about 0.03 to 1.0 mil thick with the thinner films providing better results. Such a membrane rests upon a suitably perforated or porous support member 13 and thus defines an upper duct or chamber 14 through which a gas mixture flows and a lower portion or chamber 15 which is sealed from the gas flow in the upper portion of the duct so that any gas entering chamber 15 must pass through membrane 12. A helium containing gas, for example, is introduced into duct 11 by a suitable flow means such as a pump or blower 16 to pass therethrough and exhaust through exit 17. In order to provide more positive transfer or permeation of helium through the permeable membrane 12, chamber 15 is connected to a suitable low pressure device such as a vacuum pump or compressor 18. By this arrangement a measured amount of a gas mixture passes through duct 11 over a predetermined area of permeable membrane 12 with a certain fraction of the gas permeating membrane 12 and being removed by pump 18.

The low pressure conditions in chamber 15 accelerate the permeation of gases and helium enriched gas is obtained at the compressor 18 outlet. The degree of enrichment is dependent on such variables as amount of helium in the gas flowing through apparatus 10, the entering gas pressure in chamber 14, and the vacuum or low pressure conditions in chamber 15. More importantly, the degree of enrichment depends on the permeation rate of a given gas such as helium through the membrane relative to the permeation rate of a gas mixed with the helium. Where the permeation rate for one gas is substantially different than that of another gas, much more of the one gas flows through the membrane in the equivalent period of time.

The units of permeability (or permeability constant, identified as "Pr") as employed in this application are in the metric system and follow the relationship at a given temperature of $$Pr = \frac{(cc.)(cm.)}{(sec.)(cm.^2)(cm.\ Hg\Delta p)}$$

where cc. is the volume of the permeating gas, cm. is the thickness of the membrane, sec. is the time in seconds for a given amount of gas to be permeated, $cm.^2$ is the area of the membrane, and cm. $Hg\Delta p$ is the pressure difference over the membrane in cm. of Hg. The measurement of permeabilities of the various gases is obtained by simple test and calculation. For the permeability determinations of this invention, a polyarylene oxide membrane is clamped in a simple permeation cell where both sides of the membrane may be degassed by applying low pressure or vacuum conditions on each side. Then a gas at known pressure is introduced to one side of the membrane while the low pressure side leads to a McLeod gage and a pressure rise indicates permeation rate. For gas mixtures, the low pressure side may be connected to a mass spectrometer where the gas is analyzed and rate of permeation measured.

A simple apparatus 10 of the type described in FIG. 1 will suffice in many instances where permeability provides sufficient gas separation or enrichment in a single pass. A higher degree of separation or a higher degree of purity may be obtained where more than one such apparatus 10 is employed as illustrated in FIG. 2. Referring now to FIG. 2, there is illustrated a double unit separator device utilized, for instance, to obtain helium from gases containing helium. This device is particularly adaptable for separation of helium from air.

In FIG. 2 the plural separator unit 20 is a two-stage separator which includes a pair of the separator units of FIG. 1 with 21 being the first stage, and 22 being the second stage. A common polyarylene oxide membrane member 23 is employed to define an upper chamber 24 and two lower chambers 25 and 26. A gas containing helium is introduced into the upper chamber 24 by means of a blower or pump 27 and exits through exhaust opening 28. At the same time low pressure conditions are established in lower chambers 25 and 26, by means of suitable pumps or compressors 29 and 30. As one example, the pressure in chamber 24 is about 10 atmospheres while the pressure in chambers 25 and 26 is maintained at about 0.1 atmosphere.

It is of course understood that the polyarylene oxide membranes are advantageously suitably supported by porous slabs, screens, etc. However, since thin films of polyarylene oxide resins have considerable strength, the noted pressures may be higher and thus separation increased and film area reduced. For example, I have found that helium permeates through a polyarylene oxide resin membrane up to about 21 times the rate of methane.

Such units as described for FIGS. 1 and 2 are only effective because of the permeability characteristics of thin films of polyarylene oxide resin and the wide difference in permeability specifically between gases as described. Advantages of the unit of FIG. 2 apparatus over that of FIG. 1 are that the desired gas can be concentrated to higher purity using more than one stage, and the polyarylene oxide membrane area can be considerably reduced by compressing the incoming gas. Obviously a considerable number of stages or units can be employed to further improve the degree of separation or enrichment.

In order that those skilled in the art may better understand how the present invention may be practiced, the following examples are given by way of illustration and not by way of limitation. In these tests, the polyxylylene oxide film was 0.15 mil thick, the polydimethyl-siloxane rubber (identified as "silicone rubber") was 1 mil thick, the polycarbonate resin film (which can be made, for example, from bisphenol-A and diphenyl carbonate as more particularly described in U.S. Patent 2,946,766, issued July 26, 1960) was 0.1 mil thick, and the polyethylene terephthalate (Mylar resin) and the polyvinyl chloride films were 0.1 mil thick.

Example 1

In this example, a polymer made from 2,6-xylenol of 0.6 intrinsic viscosity, as described above, was cast into a film 0.15 mil in thickness. This film was used as a permselective membrane in the apparatus described in FIG. 1 for this example and all succeeding examples. The specific gas was introduced to the high pressure side at atmospheric pressure. The rate of pressure build-up on the low pressure side, which was initially evacuated to about $10^{-5}$ atmospheres, was measured by a McLeod gage while the pressure was varied from about $10^{-5}$ to $10^{-3}$ atmospheres. The permeability constants (identified as "Pr") of the various gases passed through the polyxylylene oxide film at about 25° C. are given in Table I.

TABLE I

| Gas: | Pr |
|---|---|
| He | $9 \times 10^{-9}$ |
| $D_2$ | $12 \times 10^{-9}$ |
| $CH_4$ | $0.43 \times 10^{-9}$ |
| $N_2$ | $0.36 \times 10^{-9}$ |
| $H_2$ | $13 \times 10^{-9}$ |
| $CO_2$ | $8.5 \times 10^{-9}$ |
| $O_2$ | $1.75 \times 10^{-9}$ |
| Argon | $0.7 \times 10^{-9}$ |
| CO | $0.6 \times 10^{-9}$ |

It can be seen from the above table, thaa a polyarylene oxide resin membrane is far more permeable to helium than to $CH_4$ and thus helium may be effectively removed from a mixture of these gases by the use of such a membrane. In addition it is noted that helium permeates this membrane about 25 times as easily as nitrogen and about 5 times as easily as oxygen, while oxygen is about 5 times as permeable as nitrogen, and hydrogen is 35 times as permeable as nitrogen. It should be understood, however, that various factors such as temperature, pressure, the orientation of the membrane material, the amount of the crystallinity, etc., in the polyarylene oxide resin, may affect permeability. There are also variances in permeability in polyarylene oxide resins produced from different processes; these variances, as mentioned, are of minor nature and do not affect the basic differences in permeability as set forth.

When the above permeation rates of gases through the polyxylene oxide film are compared with a 1 mil thick silicone rubber film prepared as described in my above-identified application, Serial No. 269,430, for oxygen enrichment of air, the first thing that will be noted (in addition to the 0.15 mil thick polyarylene oxide film being as strong as the corresponding 1.0 mil thick silicone rubber film) is that the ratio of oxygen to nitrogen permeation rates will be 4.8 in connection with the polyarylene oxide film as contrasted to 2.15 when using the silicone rubber film. If one desires to make 10 liters per minute of air containing 43.5% oxygen, a cell such as that outlined in FIG. 1 would be used (modified to the extent that the two-stage device of FIG. 2 would be employed for the silicone rubber unit) with the following numerical requirements for the pressures (i.e., vacuums), areas of film, and compressive work, with the results shown in Table II, assuminng that the air entering the cell is approximately 21% oxygen.

TABLE II

|  | Polyarylene Oxide Film [1] | Polydimethyl-siloxane Film [2] |
|---|---|---|
| Vacuum | 0.23 atmosphere | First stage 0.033 atmospheres. Second stage 0.10 atmospheres. |
| Area of film required | 1.85 sq. yds | 46 sq. yds. |
| Compressive work [3] | 0.045 H.P | 0.262 H.P. |

[1] Requires only one stage to yield air containing 43.5% oxygen.
[2] Requires two stages to yield same amount of oxygen in air as in (1).
[3] To produce a flow of 10 liters gas per minute.

I have found that a one-stage cell employing a polyarylene oxide film could produce air enriched to as high as 55% oxygen enrichment compared to 36% oxygen enrichment, which is the maximum one can obtain in a one-stage silicone rubber cell. By compressing the incoming air to the polyarylene oxide cell, the area of film required for a given production rate can be greatly increased. For example, to produce 10 litres per minute of 43.5% oxygen enriched air, one would need only 32 square yards of film of about 0.15 mil thick (at about 10 atmospheres pressure), employing a compressive work of 0.133 H.P. for the input of 27 liters per minute of air, and a compressive work of 0.05 H.P. to evacuate approximately 10 liters of oxygen-enriched air per minute.

An approximate estimate of the cost of operating the two cells, one being a one-stage polyarylene oxide unit and the other being a two-stage silicone rubber unit, is as follows: assuming that the electrical power for the compressors costs 2 cents per kilowatt hour, the over-all efficiency is 50% and assuming that the film in each case costs $1.00 per square yard, and compressors and motors cost $310.00W$^{0.87}$, where W is in horsepowers of compressive work, and assuming further that the initial cost for the membrane and compressors must be written off in two years, then on this basis, the cost per day for 10 liters of oxygen-enriched air per minute obtained from the 1 mil thick silicone rubber cell is $0.186 + $0.201 dollars = $0.387/day
←(for power) (for equipment write-off)

For the 0.15 mil thick polyarylene oxide cell, the cost per day is $0.032 + $0.29 = $0.32/day
(for power) ←(for equipment write-off)

For an oxygen enrichment greater than 43.5%, the savings of a permselective membrane cell using the polyarylene oxide cell over a silicone rubber cell are even more substantial.

It is thus apparent that the unique combination of properties of the polyarylene oxide membrane, namely, very high separation factors, relatively high absolute permeation rates, high strength and the ability to form thin films, makes this material of great importance and advantage in the permselective membrane field.

The separation of nitrogen and hydrogen is of interest because a commercial source of both gases is derived from cracked ammonia. The following example illustrates one convenient and economical process for obtaining either purified nitrogen or purified hydrogen or both purified, depending on the design of the system.

*Example 2*

Using the polyxylylene oxide film in the same fashion as was used in Example 1, a mixture of nitrogen and hydrogen, in a mol ratio of 1 to 3, was passed over the surface of the film described in FIGURE 1 while a reduced pressure on the other side of the film of about 0.01 atmosphere was applied. As a result of passage of this mixture of gases through the film, the first stage resulted in the percent hydrogen in the extract rising from 75% to 99%; if this latter extract gas is passed through the membrane again, the hydrogen that is obtained is better than 99.9% purity. In the following Table III, both the ratios of $Pr_{H_2}$ to $Pr_{N_2}$, identified as $H_2/N_2$, and the absolute permeation rates of hydrogen are shown for various polymers including the above-described polyxylylene oxide polymer, a polydimethylsiloxane rubber, the polycarbonate resin, polyvinyl chloride, and polyethylene terephthalate. It will be noted from Table III that the polyxylylene oxide resin film is considerably superior to the other membranes when both the separation factor and permeability are considered.

TABLE III

| Membrane | $H_2/N_2$ | $Pr_{H_2}$ |
|---|---|---|
| Polyxylylene oxide | 36 | 13×10$^{-9}$ |
| Silicone rubber | 2 | 65×10$^{-9}$ |
| Polycarbonate Resin | 45 | 2.6×10$^{-9}$ |
| Polyethylene terephthalate | 120 | 0.06×10$^{-9}$ |
| Polyvinyl chloride | 72 | 1.3×10$^{-9}$ |

*Example 3*

In this example, methane and helium separately (which together form the main constituents of natural gas) were each passed through a 0.15-mil thick polyxylylene oxide membrane of the same type as was used in the preceding examples, at a temperature of about 25° C., employing the same equipment as described in Example 1 and FIG. 1. The same gases were passed through a cell where the membrane was a silicone rubber. The following Table IV shows the $Pr_{He}$ as well as the ratio of permeabilities of helium to methane (identified as "He/CH$_4$").

TABLE IV

| Membrane | He/CH$_4$ | $Pr_{He}$ |
|---|---|---|
| Polyxylylene oxide | 21 | 9×10$^{-9}$ |
| Silicone rubber | 0.3 | 30×10$^{-9}$ |

*Example 4*

In this example, air was passed over the same membranes as referred to in Example 3 for the purpose of determining to what extent helium could be separated from the air. The following Table V shows the various values for the permeability ratio of helium to air as well as the permeation rate of helium through each of the membranes.

TABLE V

| Membrane | He/Air | $Pr_{He}$ |
|---|---|---|
| Polyxylylene oxide | 14 | 9×10$^{-9}$ |
| Silicone rubber | 0.9 | 30×10$^{-9}$ |

One of the important gas separations is the separation of hydrogen isotopes (e.g., hydrogen from deuterium, $D_2$). Separation of hydrogen from deuterium has been undertaken by cryogenic distillation. Other methods utilize hydrogen and deuterium-containing compounds. In the latter case the compounds must be decomposed to recover the deuterium. Among the methods for accomplishing this separation are by thermal diffusion or by various chemical processes in which hydrogen and $D_2$ are in the form of $H_2S/D_2S$ or $H_2O/D_2O$. The separation between the $H_2$ and $D_2$ is ordinarily so inefficient or has to be carried out at such a low temperature, that such methods presently hold little economic attraction. Although the separation of hydrogen compounds from deuterium compounds can be carried out relatively efficiently, the separated deuterium compound must eventually be decomposed to recover $D_2$. The following example shows the important utility of polyarylene oxide films for the separations of $H_2$ and $D_2$, which would also be exemplary of the separation of $H_2$ from $T_2$ (tritium) and $D_2$ from $T_2$.

*Example 5*

In this example, employing the equipment described in FIG. 1, gas streams of $H_2$ and of $D_2$ were passed over the polyxylylene oxide membrane separately at about 25° C., while applying a reduced pressure on the other side of the membrane. The following Table VI shows permeability constants for each of the gases as well as the separation factors for these gases when using, in one instance of the polyxylylene oxide film and in the other instance the above-described polydimethylsiloxane rubber film.

TABLE VI

| Membrane | $Pr_{H_2}$ | $Pr_{D_2}$ | $H_2/D_2$ |
|---|---|---|---|
| Polyxylylene oxide | $11.01 \times 10^{-9}$ | $9.67 \times 10^{-9}$ | 1.14 |
| Silicone rubber | $60 \times 10^{-9}$ | $56 \times 10^{-9}$ | 1.07 |

Repeated cycling of mixtures of these gases will give residual gases richer in $D_2$. The ability to concentrate $D_2$ and $T_2$, and alternatively to obtain pure $D_2$ and $T_2$, is important because of the potential use of $D_2$ and $T_2$ as fusion fuels. Also deuterium is found useful as a tracer in biological and chemical experiments.

*Example 6*

In this example, helium[3] and helium[4] were each passed over various films of the type described above employing the same apparatus and conditions as recited in Example 1 and FIG. 1. The following Table VII shows the results of the passage of this mixture of gases.

TABLE VII

| Membrane | $Pr_{He^3}$ | $Pr_{He}$ | $He^3/He^4$ |
|---|---|---|---|
| Polyxylylene oxide | $8.23 \times 10^{-9}$ | $7.46 \times 10^{-9}$ | 1.10 |
| Polyvinyl chloride | $0.873 \times 10^{-9}$ | $0.825 \times 10^{-9}$ | 1.06 |
| Silicone rubber | $36 \times 10^{-9}$ | $36 \times 10^{-9}$ | 1.00 |

It will be noted from the above table that the polyxylylene oxide film has the highest separation factor. Helium[3] has many potential uses, particularly as a fuel in fusion devices where it will be desirable to separate the helium[3] and helium[4] produced in the fusion device in order to recycle helium[3]. Furthermore, He[3], because it has a boiling point 0.6° K. lower than He[4], pure He[3] is the most desirable low temperature (cryogenic) refrigerant known.

*Example 7*

In this example a polyarylene oxide film was prepared in the same fashion as the above-described polyxylylene oxide resin with the exception that the polyphenylene oxide contained methyl and decyloxy groups in the 2-, 6-positions. This polymer which had an intrinsic viscosity $\eta=0.44$, was cast into a film 1 mil thick and oxygen and nitrogen were each passed through the film under equivalent conditions in the same manner as described in Example 1. It was found that the permeability ratio of the oxygen to nitrogen $(O_2/N_2)$ was 5.4.

*Example 8*

In this example, a polymer was prepared similarly as was done in connection with the procedure used to prepare the above-described polyxylylene oxide composition and the methyl decyloxyphenylene oxide polymer of Example 7, with the exception that the polymer contained methyl and isooctyl groups in the 2-, 6-positions. This polymer, which had an intrinsic viscosity $\eta=0.47$, was cast into a film 1 mil thick. When oxygen and nitrogen were each passed through the film in the manner described in Example 1, it was found that the permeability ratio of the $O_2/N_2$ was about 5.2.

I have also discovered that the separation factors for various gases can be materially improved by orienting the polyarylene oxide filim. Thus, I have found that either uniaxial or biaxial elongation on the order of from 10 to 200% elongation or higher extensions of the film, and advantageously from 25 to 100% elongation, can result in considerable improvement in the separation of certain gases passing through the polyarylene oxide film. In this connection, measurements were made on oriented films for gases of oxygen, nitrogen and hydrogen. The following example shows results of these tests.

*Example 9*

In this example polyxylylene oxide films of about 1 mil thick were oriented in various ways and the permeability rates of hydrogen, oxygen and nitrogen gases were determined, and the permeability ratios $O_2/N_2$ and $H_2/N_2$, were calculated. Table VIII shows the results of orienting the film on the permeability ratios at a temperature of about 25° C.

TABLE VIII

| Film | Permeability Ratios | |
|---|---|---|
| | $O_2/N_2$ | $H_2/N_2$ |
| Regularly cast | 4.85 | 36.0 |
| Film elongated 25% one direction, 12% in other | 5.23 | 39.2 |
| Film elongated 25% in one direction, contracted 25% in other direction | 5.85 | 47.8 |
| Film elongated 55% in one direction, contracted 20% in other direction | 5.55 | 45.5 |

When the polyxylylene film was randomly oriented so that the elongation was about 30% in both directions, the permeability ratios obtained by passing the various gases through this oriented polyxylylene oxide film were determined and are described in Table IX.

TABLE IX

| Gas Combination | Normal Permeation Ratio | Permeation Ratio on Oriented Samples* |
|---|---|---|
| $O_2$–$N_2$ | 4.85 | 5.3 |
| $H_2$–$N_2$ | 36.0 | 42.3 |
| He–$CH_4$ | 21.0 | 25 |
| He–$O_2$ | 5.1 | 5.39 |
| He–$N_2$ | 25.0 | 29.1 |

*Average of three tests each.

It will of course be understood by those skilled in the art that, in addition to the polyxylylene films employed in the above examples, other polyarylene oxide films, many examples of which are given above and in the abovementioned Hay article and French patent can also be employed. The conditions whereby the foregoing gases as well as other mixtures containing these gases may be passed through the polyarylene oxide membrane obviously may be varied depending on the type of equipment employed, the particular mixture of gases, the sources of the gases, the purity desired, etc. Other gases can be subjected to separation by the polyarylene oxide films, as e.g., oxygen[16], oxygen[18], argon, xenon, krypton, radon, etc.

What I claim as new and desire to secure by Letters Patent of the United States is:

1. In a process for the separation of a gas selected from the class consisting of helium, hydrogen and oxygen from a mixture of gases containing at least one of the recited gases, wherein the mixture of gases is brought into contact with one side of a thin, non-porous polymeric membrane, while a reduced partial pressure in the gas to be separated is maintained on the opposite side of said membrane as compared to the partial pressure thereof on said one side, the improvement comprising the use of a solid polyarylene oxide film as the membrane, the solid polyarylene oxide film being composed of recurring structural units of the formula

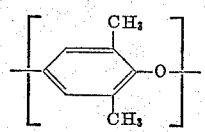

there being at least 100 of the aforesaid units in the polymer, thereby to obtain a gaseous product enriched in one of the said recited gases.

2. The process as in claim 1 wherein the mixture of gases is air.

3. The process as in claim 1 wherein the mixture of gases consists essentially of hydrogen and nitrogen.

4. The process as in claim 1 in which the mixture of gases consists essentially of helium and methane.

5. The process as in claim 1 in which the mixture of gases consists essentially of hydrogen and deuterium.

6. The process as in claim 1 in which the mixture of gases consists essentially of helium $^3$ and helium $^4$.

7. In a process for the separation of a gas selected from the class consisting of helium, hydrogen and oxygen from a mixture of gases containing at least one of the recited gases, wherein the mixture of gases is brought into contact with one side of a thin, non-porous polymeric membrane, while a reduced partial pressure in the gas to be separated is maintained on the opposite side of said membrane as compared to the partial pressure thereof on said one side, the improvement comprising the use of a solid polyarylene oxide film as the membrane said film being oriented by elongation thereof at least 10 percent in at least one direction.

8. The improvement recited in claim 7 wherein the polyarylene oxide film is polyxylylene oxide film.

References Cited

UNITED STATES PATENTS 3,219,626  11/1965  Blanchard et al. _____ 260—613

FOREIGN PATENTS 1,234,336  5/1960  France.

OTHER REFERENCES

Brubaker et al.: Separation of Gases by Plastic Membranes. In Industrial and Engineering Chemistry 38(4) pages 733–739, April 1954, 55–16.

Norton, F. J., Permeation of Gases Through Solids. In Journal of Applied Physics 28(1) pages 34–39, January 1957, 55–16.

SAMIH N. ZAHARNA, *Primary Examiner.*

REUBEN FRIEDMAN, *Examiner.*

J. W. ADEE, *Assistant Examiner.*